United States Patent [19]

Bos

[11] Patent Number: 4,466,157
[45] Date of Patent: Aug. 21, 1984

[54] METHOD OF PROCESSING ELONGATED TUBULAR MATERIAL AND DEVICE FOR PERFORMING SAID METHOD

[75] Inventor: Arnoldus J. B. M. Bos, Heusden-Zolder, Belgium

[73] Assignee: International Chemical Engineering Establishment, Vaduz, Liechtenstein

[21] Appl. No.: 331,348

[22] Filed: Dec. 16, 1981

[30] Foreign Application Priority Data

Dec. 17, 1980 [NL] Netherlands ......................... 8006864

[51] Int. Cl.³ ............................................. A22C 13/02
[52] U.S. Cl. .......................................... 17/49; 17/1 R; 17/41
[58] Field of Search ....................... 17/1 R, 41, 42, 35, 17/49, 45

[56] References Cited

U.S. PATENT DOCUMENTS

| | | | |
|---|---|---|---|
| 2,328,085 | 8/1943 | Maccarini | 17/35 |
| 2,653,432 | 9/1953 | Wright et al. | 17/35 X |
| 4,075,737 | 2/1978 | Story | 17/42 X |
| 4,162,557 | 7/1979 | Rasmussen | 17/42 X |
| 4,292,711 | 10/1981 | Becker | 17/41 X |
| 4,307,489 | 12/1981 | Niedecker | 17/41 X |
| 4,358,873 | 11/1982 | Kollross | 17/41 X |

*Primary Examiner*—Willie G. Abercrombie
*Attorney, Agent, or Firm*—Flynn, Thiel, Boutell & Tanis

[57] ABSTRACT

In a method and device for processing elongated tubular material, more particularly for everting a sausage or packing casing having been subjected to a surface treatment, tubular material is discharged from a package or supply reel and passed through a stationary guide member having an annular cross-section. The material is folded back over said guide member and displaced within said guide member during the everting action into a direction contrary to that of the material outside the guide member. The latter forms a new package of tubular material which encloses the stationary guide member. The latter is a hollow mandrel comprising a freely projecting end, the end edge of which being adapted to fold back tubular material. Members are provided at distance from said end edge for tucking the tubular material upon said mandrel or an extension thereof.

17 Claims, 9 Drawing Figures

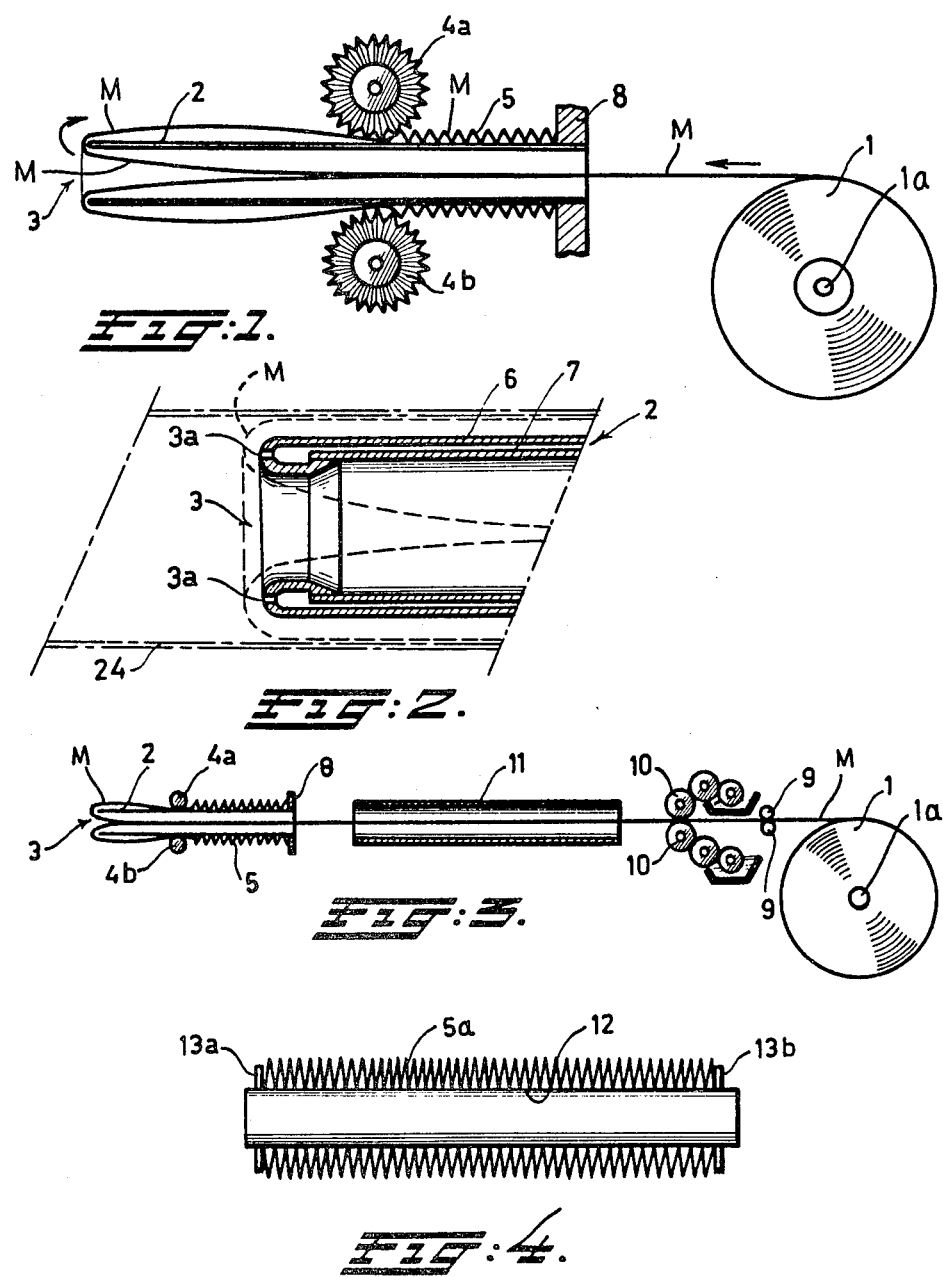

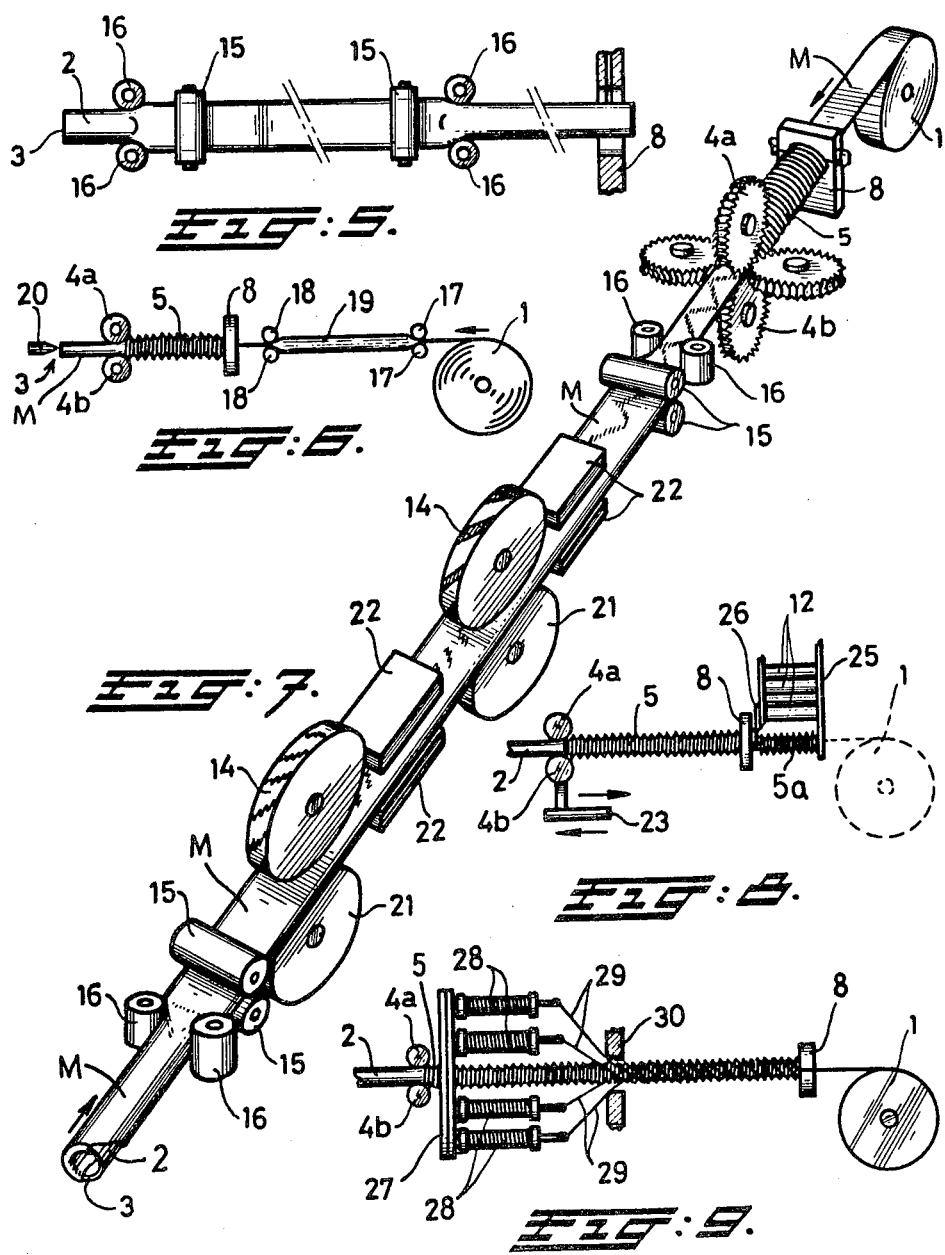

METHOD OF PROCESSING ELONGATED TUBULAR MATERIAL AND DEVICE FOR PERFORMING SAID METHOD

BACKGROUND OF THE INVENTION

1. Field of the Invention

The present invention relates to a method of processing elongated tubular material, more particularly—but not exclusively—a method of everting sausage casings or packing casings, having been subjected to a surface treatment, wherein the material is passed through a guide member having an annular cross-section and is folded back over the guide member, whilst the material within said guide member is during the everting action displaced into a direction contrary to that of the material outside said guide member.

2. Description of the Prior Art

A method of this kind is disclosed in U.S. Pat. No. 4,075,737 issued on Feb. 28, 1978 to Alfred D. Story. In the respective method tubular material is first passed from a roller through a stationary annular member, subsequently through a displaceable annular member and then folded back over the latter in order to further attach the portion of the tubular material passing both annular members, to the stationary annular member. The displaceable annular member covered by the tubular material is magnetically supported by a carriage which is driven by a motor, said carriage running along an elongated rail. In the case that the annular member is drawn along by the carriage, the end of the tubular material disposed upon a supply reel will simultaneously with the displaceable annular member, be drawn along, said curved end sliding about the latter member and remaining about the same in the space underneath the rail.

Obviously the path of travel of said displaceable annular member is dependent upon the total length of the tubular material upon the supply reel. From this it follows that an entire everting operation can only be performed when the path of travel of the displaceable annular member amounts to at least half the total length of the tubular material upon the supply reel; if, for example, 500 m of tubular material is disposed upon said supply reel, the length of the path of travel of the annular member and thus of the rail has to amount to approximately 250 m.

In actual practice this entails that the supply of the tubular material is stopped as soon as a given length of said material has been everted and the end of the material fastened to the stationary annular member, is fastened upon a core in order to appropriately form said everted material to a package by a reeling action. After having formed the second package of tubular material a subsequent portion of said material has to be passed through the two annular members, folded back around the displaceable annular member and fastened again to the stationary annular member.

The difficulties with the above described method and device are that the friction exerted by the sagging walls of the tubular material which pass each other during the everting operation, will become too intense, even when the actual space available for the path of travel of the carriage with the magnetic support for the displaceable annular member is sufficiently large. This could result in damages to the respective walls of the tubular material. Furthermore the everting action is performed intermittently, as a new front end of tubular material has always to be passed through the two annular members, to be folded back around the displaceable annular member and fastened to the stationary annular member, which is rather time-consuming.

In actual practice elongated tubular material, more particularly sausage casings, should be everted in the case that the outer side of said tubular material to be provided with a coating should subsequently be accomodated inside the tubular material. More particularly, an everting action is desirable in the case that the tubular material consists of cellulose fibers. Said tubular material is in most cases everted by means of pressurized air or by means of a vacuum, a bound off end portion of said material disposed upon a ring, being subjected to a pressure, the remaining portion of the tubular material then being pressed through said ring towards the outside.

It should be noted that a process of everting sausage casings while using a creased and compressed package of tubular material, is disclosed in Netherlands Patent Application No. 77, 14276 filed by the UNION CARBIDE CORPORATION in December, 1976 corresponding to U.S. Pat. No. 4,162,557 (Rasmussen). Said patent application describes that tubular material arriving from a supply reel, is provided with an internal coating and is subsequently tucked upon a mandrel while creasing the tubular material. The package of tubular material so obtained is subsequently disposed upon another mandrel, one end of said package having previously been drawn through the internal space in said package, and fastened upon a coiling core. The package of tubular material enclosed upon the mandrel is subsequently everted by coiling the returned portion of said tubular material, the material then being removed from the everted end upon the coiling device.

Although said method requires a device which occupies little space, the difficulty with the respective invention is that the creased package of tubular material has to be removed from one mandrel and disposed upon the other mandrel prior to the everting action. Though one and the same mandrel could be used for everting and forming the package of tubular material, said known device presents an additional disadvantage in that friction arises in the stationary inner tops of the creases in the package, which implies that said tops are subjected to an intensive wearing off, resulting in that not only the coating but also the tubular material itself will wear away.

SUMMARY OF THE INVENTION

In view of the above state of the art, it is a primary aim of the present invention to provide a novel method of processing elongated tubular material, more particularly of everting sausage casings or package casings of great length, having been subjected to a surface treatment, said great length of tubular material, more particularly of sausage casings, also being processed, during the everting action.

This is attained according to the invention by simultaneously discharging a package of tubular material and forming a new package of tubular material, while enclosing a stationary annular (preferably tubular) guide member within which and around which the material is conveyed towards or discharged from a separate package or supply reel which annular guide member is adapted for supporting a package.

Everting tubular material arriving from a supply package or reel is therefore according to the invention, performed simultaneously with the formation of a new package of tubular material, said new package having the shape of a folded and creased tube length, which tube length can be compressed upon the guide member. Preferably creased and compressed packages of tubular material are used, as the latter can be disposed immediately upon a filling mandrel of a sausage producing machine.

In the novel method according to the present invention the elongated tubular material is simultaneously drawn from a supply reel and everted whilst a new package of tubular material is formed, the tubular material being subjected to a surface treatment during the everting action either for coating said material or for providing the material with one or more prints, or both of said actions.

A device for performing the method according to the present invention comprises a hollow mandrel with a freely projecting end, the end edge of which is adapted to fold back the tubular material, means for tucking said material upon said mandrel or an extension thereof, being provided at distance from said end edge. Rotating members may cooperate with said mandrel for processing tubular material upon the same.

The features of the present invention which are believed to be novel are set forth with particularlity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a schematic section through part of the device comprising a hollow mandrel adapted to perform the method of the invention;

FIG. 2 is an axial section through the end of a mandrel in a preferred embodiment of said device;

FIG. 3 is a diagram in which additional coatings are provided on the outer side of the elongated tubular material, whereupon said material is everted;

FIG. 4 is a schematic section of a package of creased tubular material suitable for deliverance to a consumer;

FIG. 5 is a schematic plan view of an embodiment of a mandrel differing from the one of FIG. 1;

FIG. 6 is a diagram showing the treatment of the inner side of the tubular material prior to the everting action;

FIG. 7 is a perspective schematic view of the processing of tubular material upon the mandrel;

FIG. 8 is a diagram showing the removal of shortened packages of tubular material from the mandrel; and FIG. 9 is a diagram of means for the fixation of the folds of the package of tubular material.

DESCRIPTION OF THE PREFERRED EMBODIMENTS

FIG. 1 schematically shows, in basic form, a device which performs the method according to the present invention in which elongated tubular material, more particularly sausage casings or packing casings are everted. The tubular material M being drawn from a supply reel, in the form of a package 1 of material, has been pressed flat and is fed into a guide member 2 having an annular cross-section; at the end 3 of said guide member 2 the tubular material is folded back around said end 3 and further travels in the direction of a retaining device 8 for the guide member 2. From this it follows that the fed tubular material is everted and displaced during said everting action within the guide member 2 in a direction contrary to that beyond said guide member. The material around the guide member is tucked around said guide member 2 by means of rotating rollers 4a and 4b and folded in order to form a package 5 of material M abutting the retaining device 8. This basic set of elements 1, 2, 3, 4a, 4b, 5 and 8, shown in detail in FIG. 1, is shown less completely in FIGS. 2, 3 and 5–9.

Said gusset-shaped or Chinese lantern-shaped packages of compressed folded tubes are generally used since they may be slid immediately upon a filling mandrel of, for example, a conventional sausage producing machine not shown; after having closed off the front end of the tubular material, a filling material is pressed into the respective tube and the tubular material, in this case the sausage casing, is gradually displaced from the filling mandrel because of the filling pressure and arrives upon said filling material in a stretched form, so producing the desired sausages.

It will be obvious that in the method according to the invention a simultaneous discharge of a package 1 of material M and formation of a new package 5 of material M is performed, particularly consisting of elongated tubular material, more particularly sausage casings or packing casings, while enclosing a stationary guide member 2, the respective material within and without said guide member traveling toward or from a separate package or supply reel.

It will also be obvious that a reverse action can also be performed in the method according to the invention, to wit, having the material of package 5 travel toward package 1 via guide member 2, although said action is in general seldom performed.

The guide member 2 having an annular cross-section, therefore constitutes a kind of mandrel and in a very particular embodiment as illustrated in FIG. 2, said guide member 2 consists of an outer wall 6 and an inner wall 7, a space being present between said two walls for the introduction of air which may escape at the return end 3, via openings 3a. The latter feature considerably reduces the friction of the tubular material at the end of the guide member, the presence of said air additionally improving the formation of an optimally folded package 5.

Everting elongated tubular material for producing sausage casings generally occurs when the surface of the tubular material has to be treated or coated, which surface should subsequently be situated at the inner side of the tubular material.

This can be effected in the method according to the invention by subjecting the tubular material during the everting operation before and/or after the end 3 at the guide member 2 to one or more surface treatments between the two locations for the packages, as will be described hereafter.

Referring now to FIG. 3 a device for performing the method according to the invention, comprises a hollow mandrel 2 having a freely projecting end 3, the end edge of which is adapted to fold back tubular material, means being provided at distance from said end edge, for example, in the form of tucking rollers 4a and 4b for tucking the tubular material upon said mandrel 2 or upon said extension 3. Driveable rollers 9 and 10 are provided between the hollow mandrel 2 and a device 1a for the support of a package of tubular material, said driveable rollers exerting a pressure upon the tubular material passing between the mandrel 2 and the support device 1a. Due to the latter measure a surface or coating treatment of the tubular material can be performed before said material enters the guide member or the mandrel 2 from the package 1 in the form of a supply reel.

The rollers 9 may whether or not be driveable and maintain the flat tubular material in an elongated position, whilst rollers 10 are so constructed that they can apply an additional layer in the form of a coating or a local print. Between the hollow mandrel 2 and the device 1a for the support of a package 1 of tubular material, a drying device, more particularly a drying funnel 11, is provided. Said drying funnel 11 may be constructed in any arbitrary suitable manner, e.g. for radiating heat, in order to dry the additional coating or print upon the tubular material, applied by rollers 10.

Said surface treatment can according to the invention, also be performed when the tubular material to be formed into a package, is accommodated around the guide member 2 between package 5 and the everting end 3, in which event the respective surface treatment also consists of applying one or more coatings or one or more prints. The latter may e.g. be effected in case that a coating has been applied by means of the rollers 10, which coating will be situated at the inner side of the tubular material after the everting action. The relative print may then be provided at the outer side of the tubular material.

Referring now to FIG. 7 rotating rollers designed for processing the tubular material upon the mandrel 2, accurately cooperate with said mandrel 2 at distance from the end edge 3 adapted to evert the tubular material. Said rollers may be the tucking rollers 4a, 4b but also rotating printing rollers 14 for applying a print upon the tubular material upon the mandrel 2.

In order to evert tubular material of great length, for example, a length of some hundreds of meters, the mandrel 2 should also have a relatively great length so that said tubular material can be tucked upon said mandrel in an optimum manner. In such a case a single (e.g. retaining device 8) will be insufficient for the guide member 2, so that an additional support is required. Referring now to FIG. 5 the additional support members cooperating with the mandrel are constructed as supporting rollers 15 and keep said mandrel in an extended position (see also FIG. 7). The supporting rollers may be driven so as to improve and expedite the transport of material around the mandrel. A lateral deviation of the mandrel is prevented by the presence of guide rollers 16, which are also provided for a purpose still to be described hereafter.

According to the present invention, a coating or print to be applied in first instance upon the tubular material by means of the rollers 10 and a subsequent evertion of said tubular material, causing said coating or print to be disposed on the inner side of the material, need not necessarily be performed, as the present invention also enables a coating or print to be provided on the inner side of the tubular material in a known manner, which coating or print will, after the everting action, show on the outer side of the material.

Referring now to FIG. 6 the tubular material traveling between packages 1 and 5 and containing a given quantity of treatment liquid 19, is passed between two pairs of rollers 17 and 18 prior to arriving at mandrel 2 and end edge 3. After said treatment liquid has been applied upon the tubular material, drying of the same is effected by means of a blowing nozzle 20 directed toward the interior of the mandrel 2 at the end edge 3, said nozzle ejecting, for example, hot drying air. During said drying action previously dried tubular material is everted (just as seen in FIG. 2 above discussed) and subsequently formed to a package 5 by means of the tucking rollers 4a and 4b, the dried liquid 19 in the form of a coating then being positioned at the outer side of the tubular material.

Reverting again to FIG. 7 the mandrel 2 comprises a flattened portion enclosed between the guide rollers 16 (see also FIG. 5). Said flattened portion is provided for applying a coating or a print by means of the rollers 14, which print may consist of a name, a design or a combination thereof. Preferably supporting rollers 21 cooperate with the printing rollers 14, which supporting rollers 21 may also act as printing rollers, as the tubular material bears upon the flattened portion of the mandrel 2. The latter measure provides an improved possibility of a design to be printed or of the colour of same. Since the rollers 14 and 21 only exert a slight pressure, the tubular material will not get stuck upon the mandrel but will continue its path of travel. In order to improve the latter, mandrel 2 may be provided with a coating having an extremely low coefficient of friction.

As seen in the direction of travel of the tubular material, drying members e.g. in the form of infra red radiation members 22, may be provided directly after the printing rollers 14 and 21. As the supporting rollers 15 are driven, the tension of the tubular material upon the flattened portion of mandrel 2 may be accurately controlled. If necessary said supporting rollers 15 may also be provided between the rollers 14, 21, respectively.

The combined features for processing the tubular material therefore allow treated tubular material to be provided with a coating or a print either at the inner side or at the outer side of said tubular material (see also FIG. 3). The flattened portion of mandrel 2 need not necessarily be extended but may have a width similar to that of the printing rollers 14 when the respective tubular material has to be processed at the upper side of the mandrel only. The circumference of the rollers 21, in that case to be used as supporting rollers, may be adapted to the cross-section of the lower side of the mandrel.

Referring now to FIG. 8 the portion of mandrel 2 between the support or retaining device 8 and the guide rollers 16 in the vicinity thereof, (see also FIGS. 5 and 7), should obviously be relatively extended when tubular material of great length should be formed to a new package 5, from a package or supply reel 1. In order to appropriately fold said package 5, the tucking rollers 4a and 4b should preferably be mounted upon a carriage 23 (schematically shown but before the parentheses, in FIG. 8), reciprocating along the mandrel 2.

Reverting now to FIG. 2 a dotted dash line 24 denotes a second type of a tubular material which is applied upon existing material running around the mandrel 2 and end edge 3. Said second material may be provided in turn from a package in the form of a supply reel, so providing a double-walled tubular material consisting of main tubular material denoted by a dotted line and coating material denoted by said dotted dash line 24, so that the main tubular material then comprises an outer, for example transparent, coating. A reverse action is, however, also possible, causing the material denoted by dot-dash line 24 to be the main material, e.g. cellulose fibrous material, the coating material then being the material denoted by a dotted line. The product so obtained then comprises an internal coating.

Referring now to FIG. 8 the extremely long package 5 of tubular material formed upon the mandrel 2 should be shortened into the conventional commercial lengths. For that purpose package 5 is slid upon a hollow core 12 and retained by means of discs 13a and 13b provided upon core 12 (FIG. 4). The hollow core 12 and the discs 13a and 13b may for example, consist of cardboard. The cores 12 are provided from a store 25 and accommodated at the retaining device 8 on the extended portion of the mandrel 2, until the material of the package 1 in the form of a supply reel, has entirely been used, whereupon the retaining device 8 is opened (see FIG. 5) so that the stripped material of package 5 is slid onto said hollow core 12 past the opened retaining device 8, so as to press a separate portion 5a of package 5 upon hollow core 12, for example, by rightward displacement of the carriage 23; the stripped tubular material is cut through by means of a knife 26 and core 12 with tubular material portion 5a upon the same is removed, a new core 12 meanwhile being slid before mandrel 2. After the everting action of the tubular material, supplied from package 1 in the form of a supply reel, has been fully completed and the material is discharged as separate package portions 5a (i.e. as separate and successively cut-off segments 5a of the long package 5), a new supply reel 1 can be provided and the tubular material upon the same can be everted and formed to a new long package 5 and subsequently to several separate shortened package portion 5a.

So, the retaining device 8 is temporary and serves, besides the supporting rollers 15, to accurately control the position of the mandrel 2 and to abut the leading end of the material of the package 5 as package 5 is being formed.

In addition to hollow cores, e.g. consisting of cardboard, the package portions 5a of FIG. 8 of tubular material may also be provided with a plaited sleeve as in FIG. 9, in order to maintain the creased condition of said package portions. In conventional packaging machines each length of material is provided with a separate plaited sleeve. As package 5 formed upon the mandrel 2 of the present invention has an extremely great length, providing a separate sleeve for each outputted package portion 5a has become superfluous since said sleeve can now, according to the invention, directly be formed upon the mandrel. Referring now to FIG. 9 a support and a plate 27 are provided around mandrel 2, bobbins 28 upon said plate 27 providing a package 5 with a surrounding plaited sleeve by means of "yarns" 29 moving along a yarn guide 30. If necessary the plate 27 and yarn guide 30 may be slid axially along the mandrel 2, whereupon the produced package 5 can be removed from the mandrel and shortened by removing portions 5a, during which action the plaited sleeve is, when necessary, fixed by means of adhesive tape or clamps. Obviously a knitting device can be used instead of a plaiting device.

AS a removal of completed shortened, separate packages 5 from the mandrel 2, is more time-consuming than an everting action, preferably the portion of mandrel 2 upon which package 5 has been formed is separated from the remaining portion of the mandrel and replaced by a new portion after the store of material in the form of a package or supply reel 1 has run out. Hereupon a new package of tubular material can be everted and formed to separate shortened packages.

What is claimed is:

1. A method of processing elongated tubular materials passing the leading end of the tubular material from a supply package through the interior of a hollow guide member of annular cross-section toward one end of said guide member;

folding and thereby everting the leading end of the material at an everting point adjacent said one end of the guide member back over said guide member;

displacing the everted material outside said guide member in a direction contrary to that of the noneverted material inside the guide member while continuing the everting action;

during or shortly after the everting action, creasing and tucking the tubular material upon the guide member to form a corrugated new package; and thereby simultaneously discharging said supply package of tubular material into the hollow guide member and forming a new package of tubular material after the everting point and enclosing the guide member.

2. The method of claim 1 including, during the everting action, subjecting the tubular material prior to and/or after the everting point to one or more surface treatments between the supply package and the new package being formed.

3. The method of claim 2 in which said surface treatment is performed prior to the tubular material from the supply package entering the guide member.

4. The method of claim 2 wherein the surface treatment is performed on the tubular material surrounding the guide member between the package to be formed and the everting point.

5. The method of claim 2 in which the surface treatment comprises applying a coating.

6. The method of claim 2 wherein the surface treatment comprises applying printing.

7. The method of claim 1 wherein a tubular coating is applied around the tubular material on the guide member adjacent the everting point.

8. A device for processing elongated tubular material, comprising:

a hollow mandrel having an open inlet end disposed adjacent a supply of tubular material for receiving the leading end of said tubular material into said hollow mandrel, said mandrel being open from end to end for movement of said tubular material therethrough, said hollow mandrel extending from said inlet end to a freely projecting open outlet end in turn having an everting edge for folding back said tubular material in an everted manner onto the outside of said hollow mandrel;

means spaced along said hollow mandrel between said everting end edge and inlet end for tucking the everted tubular material upon the outside of said mandrel or an extension thereof in a direction opposite the movement of tubular material inside said hollow mandrel.

9. The device of claim 8 including drivable rollers provided between the hollow mandrel and said supply of tubular material, for exerting of pressure upon the tubular material traveling toward the mandrel.

10. The device of claim 9 wherein a drying funnel is provided between the hollow mandrel and the supply of tubular material.

11. The device of clam 8 wherein rotatable members are provided along the tubular mandrel at a distance from the everting end edge and cooperate with the mandrel for treating everted tubular material upon said mandrel.

12. The device of claim 11 in which the rotatable members are printing rollers for providing the everted material upon the mandrel with printing.

13. The device of claim 11 in which the rotatable members are adapted to provide the material upon the mandrel with a coating.

14. The device of claim 11 in which the rotatable members are rollers for supporting the mandrel.

15. The device of claim 11 in which the rotatable members are driven rollers for conveying the tubular material upon the mandrel.

16. The device of claim 8 in which drying members are disposed in lateral direction of the mandrel and in the direction of travel of the tubular material, in order to dry any prints or coatings applied upon the tubular material disposed upon the mandrel.

17. The device of claim 8 wherein the mandrel is engaged by a removable retaining device and an additional means in the form of sandwiching pairs of rollers, for supporting and retaining said mandrel, at least one said roller pair being near the end edge adapted to evert tubular material.

* * * * *